United States Patent [19]
Kirihara et al.

[11] Patent Number: 6,104,677
[45] Date of Patent: Aug. 15, 2000

[54] RECORDING MEDIUM RECORDING APPARATUS AND METHOD AND RECORDING MEDIUM

[75] Inventors: Kazushi Kirihara, Tokyo; Tasushi Nashida, Kanagawa, both of Japan

[73] Assignee: Sony Corporation, Tokyo, Japan

[21] Appl. No.: 09/046,665

[22] Filed: Mar. 25, 1998

[30] Foreign Application Priority Data

Mar. 26, 1997 [JP] Japan .................................. 09-073201

[51] Int. Cl.⁷ .................................................. G11B 13/00
[52] U.S. Cl. .......................................... 369/14; 369/275.2
[58] Field of Search .......................... 369/14, 13, 275.2, 369/275.3, 33, 54, 58, 275.1, 274

[56] References Cited

U.S. PATENT DOCUMENTS

| | | | |
|---|---|---|---|
| 4,967,286 | 10/1990 | Nomula et al. ........................ | 386/124 |
| 5,398,231 | 3/1995 | Shin et al. ............................ | 369/275.4 |
| 5,608,717 | 3/1997 | Ito et al. ............................... | 369/275.3 |
| 5,608,718 | 3/1997 | Schiewe ............................... | 369/275.4 |
| 5,748,607 | 5/1998 | Ohira et al. .......................... | 369/275.4 |
| 5,751,690 | 5/1998 | Ohira et al. .......................... | 369/275.3 |
| 5,781,526 | 7/1998 | Nishizawa et al. .................. | 369/275.3 |

*Primary Examiner*—Tan Dinh
*Attorney, Agent, or Firm*—Hill & Simpson

[57] ABSTRACT

A recording medium recording apparatus includes data input means for inputting data to be recorded on a recording medium, data recording means for recording the data onto the recording medium, related information input means for inputting information relating to the data, and related information recording means for recording the related information onto the recording medium. When data is recorded onto the recording medium, related information is recorded onto the recording medium by the related information recording means. The recording medium has a related information recording section where related information is to be recorded. Related information is recorded onto the related information recording section by the related information recording means so as to be visually recognizable.

17 Claims, 13 Drawing Sheets

TRANSPARENT STATE

FIG.10C

CLOUDY STATE

FIG.16A
CLOUDY STATE

FIG.16B
TRANSPARENT STATE

RECORDING MEDIUM RECORDING APPARATUS AND METHOD AND RECORDING MEDIUM

BACKGROUND OF THE INVENTION

The present invention relates to a recording medium recording apparatus and method and a recording medium. In particular, the invention relates to a recording medium recording apparatus and method in which when data is recorded onto a recording medium, information relating to the data is also recorded onto the recording medium, as well as to a recording medium for such a purpose.

Figure 1:
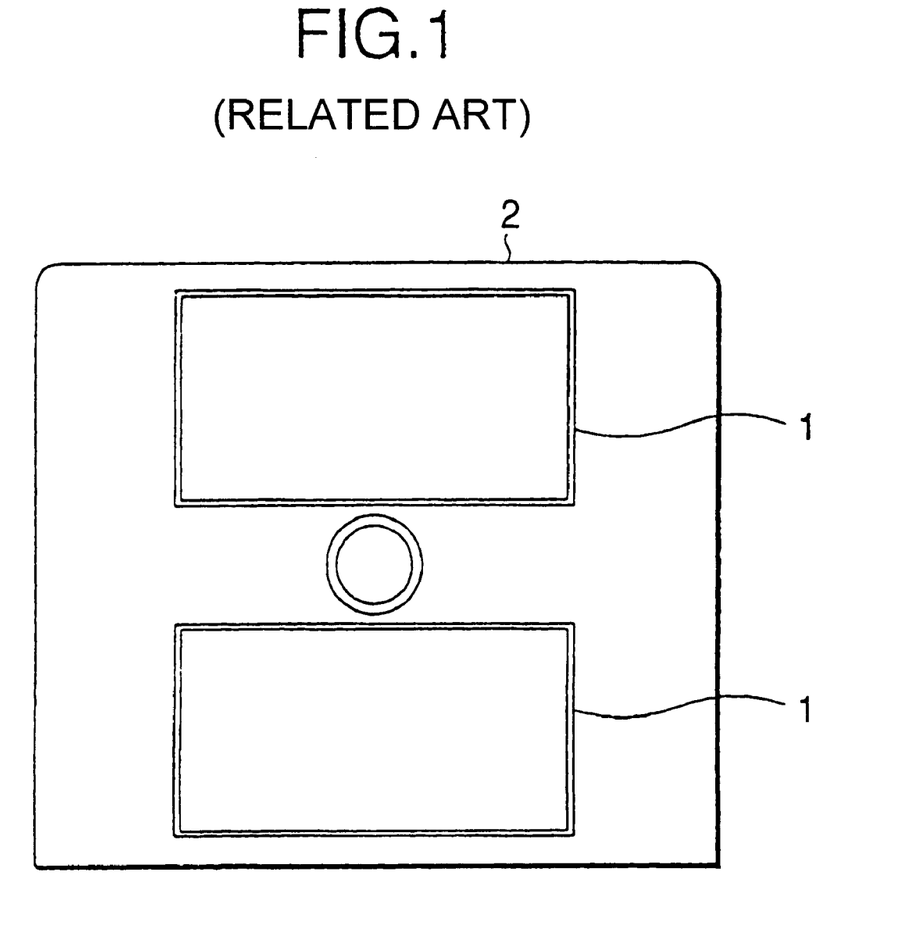
FIG. 1 shows a display example of a conventional index label.
Figure 2A:
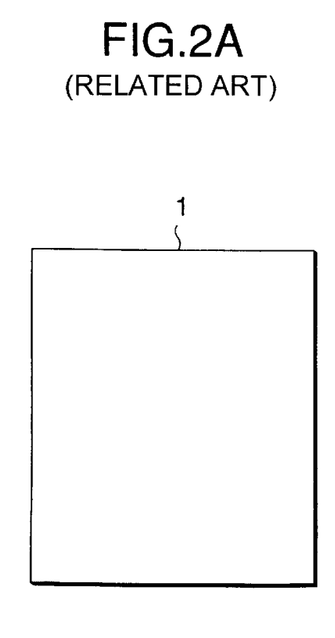
FIGS. 2A–2C show a conventional method of writing information on recorded contents on an index label.
Figure 2B:
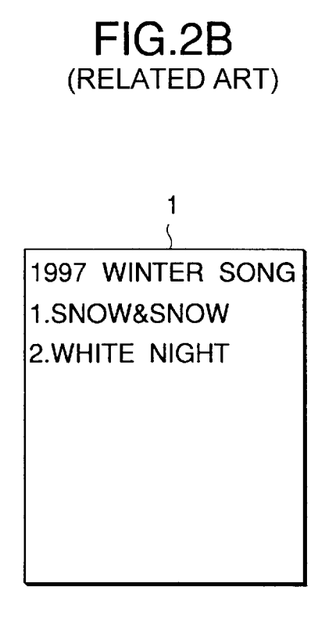
Figure 2C:
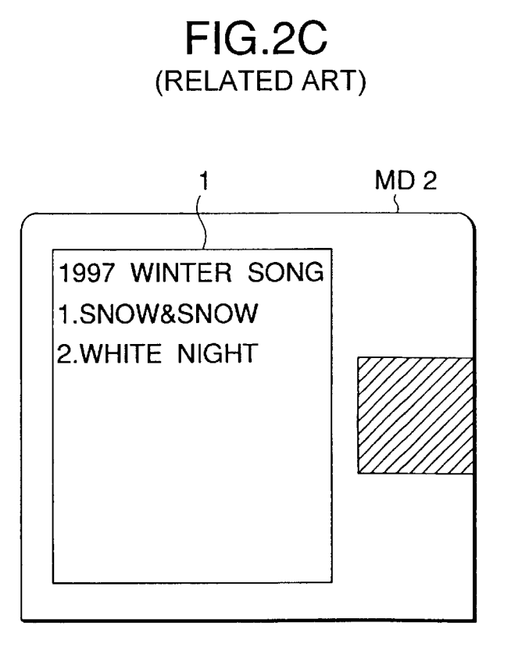

FIG. 1 shows a conventional method for enabling a user to check later musical information or the like that is recorded on a MD (mini-disc; trademark). In this case, as shown in FIG. 2A, first the user prepares an index label 1 on which no information is written. Thereafter, he writes recorded contents (for instance, song names, a title, etc.) thereon with a pen as shown in FIG. 2B, and then sticks, to an MD 2, the index label 1 on which the recorded contents are written as shown in FIG. 2C. When the user alters the recorded contents of the MD 2 on which the index label 1 is stuck, he writes recorded contents on a new index label 1 and sticks it in place of the old one or he rewrites the entries on the current index label 1.

However, the above method of writing recorded contents on the index label 1 has a problem that a user is required to repeat cumbersome operations of sticking the index label 1 and peeling it or rewriting the entries every time he records information or alters recorded information.

SUMMARY OF THE INVENTION

The present invention has been made in the above circumstances, and an object of the invention is therefore to makes cumbersome operations unnecessary by automatically recording information relating to data onto a recording medium in recording the data.

The invention provides a recording medium recording apparatus comprising data input section for inputting data to be recorded on a recording medium; data recording section for recording the data onto the recording medium; related information input section for inputting information relating to the data; and related information recording section for recording the related information onto the recording medium.

The related information recording section may record the related information when the data is recorded onto the recording medium.

The invention also provides a recording medium comprising a data recording section onto which data is to be recorded in a state that the recording medium is mounted in a recording apparatus; and a related information recording section onto which related information that relates to the data is to be recorded in a state that the recording medium is mounted in the recording apparatus.

The invention further provides a recording medium recording method comprising the steps of inputting data to be recorded on a recording medium; recording the data onto the recording medium; inputting information relating to the data; and recording the related information onto the recording medium.

The information relating to the data may be recorded when the data is recorded onto the recording medium.

DETAILED DESCRIPTION OF THE PREFERRED EMBODIMENTS

The embodiments of the present invention will be hereinafter described. To clarify the correlation between the respective means of the invention recited in the claims and the components of the following embodiments, the features of the invention will be described below in such a manner that the respective means are followed, in parentheses, by the corresponding components (just examples) of the embodiments.

That is, the recording medium recording apparatus according to the invention comprises data input means (for instance, a bus 14 in FIG. 3) for inputting data to be recorded on a recording medium; data recording means (for instance, a sound recording section 37 in FIG. 3) for recording the data onto the recording medium; related information input means (for instance, an input section 31 in FIG. 3) for inputting information relating to the data; and related information recording means (for instance, a recording section 42 in FIG. 3) for recording the related information onto the recording medium.

However, the above statement does not mean that the respective means are limited to the respective exemplary components following those.

A recording medium recording apparatus according to a first embodiment of the invention will be described below with reference to FIGS. 3–5.

Figure 4:
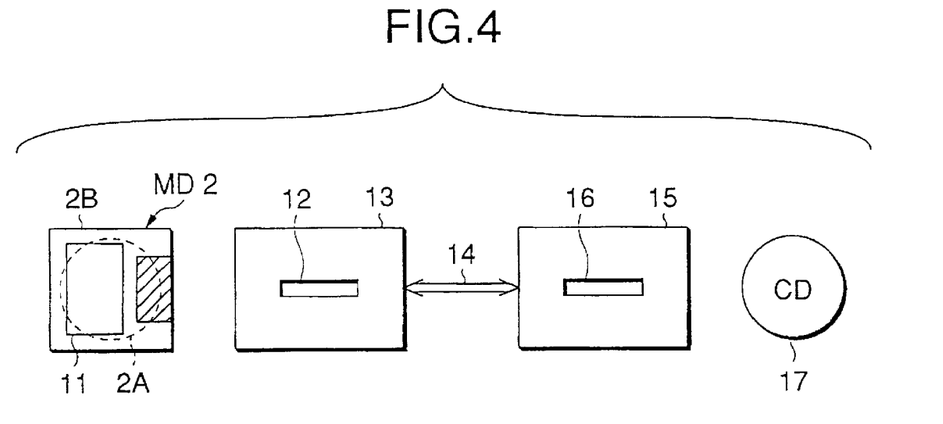
FIG. 4 is a block diagram showing the configuration of a recording medium recording apparatus according to a first embodiment of the present invention.

As shown in FIG. 4, in an MD 2, which is a magneto-optical disc enabling data recording and reproduction, a disc 2A is accommodated in a cartridge 2B as a body. A sheet 11 is bonded in advance to the cartridge 2B. If the sheet bonding surface of the cartridge 2B is formed with a shallow recess corresponding to the thickness and the shape of the sheet 11, the bonded sheet 11 is rendered flush with the surrounding surface, preventing formation of an unnecessary protrusion.

Figure 5:
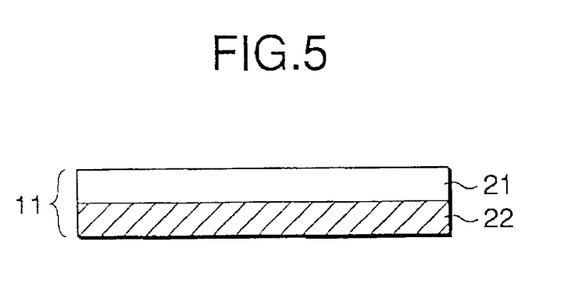
FIG. 5 is a sectional view showing an exemplary structure of a sheet 11 shown in FIG. 4.

As shown in FIG. 5, the sheet 11 is composed of a thermal member 21 capable of a reversible change between a cloudy state and a transparent state and a black back sheet 22.

An MD recorder 12 reproduces a musical signal that is recorded on the MD 2 and records, onto the MD 2, a musical signal that is output from a CD player 15, for instance. The MD recorder 12 has an MD insertion mouth 13 through which to insert the MD 2. A bus 14 serves for transmission and reception of a control signal and a musical signal between the MD recorder 12 and the CD player 15.

The CD player 15 reproduces a musical signal that is recorded on a CD (compact disc; trademark) 17. The CD player 15 has a CD insertion mouth 16 through which to insert the CD 17. The CD 17 is an optical disc enabling data reproduction.

Figure 3:
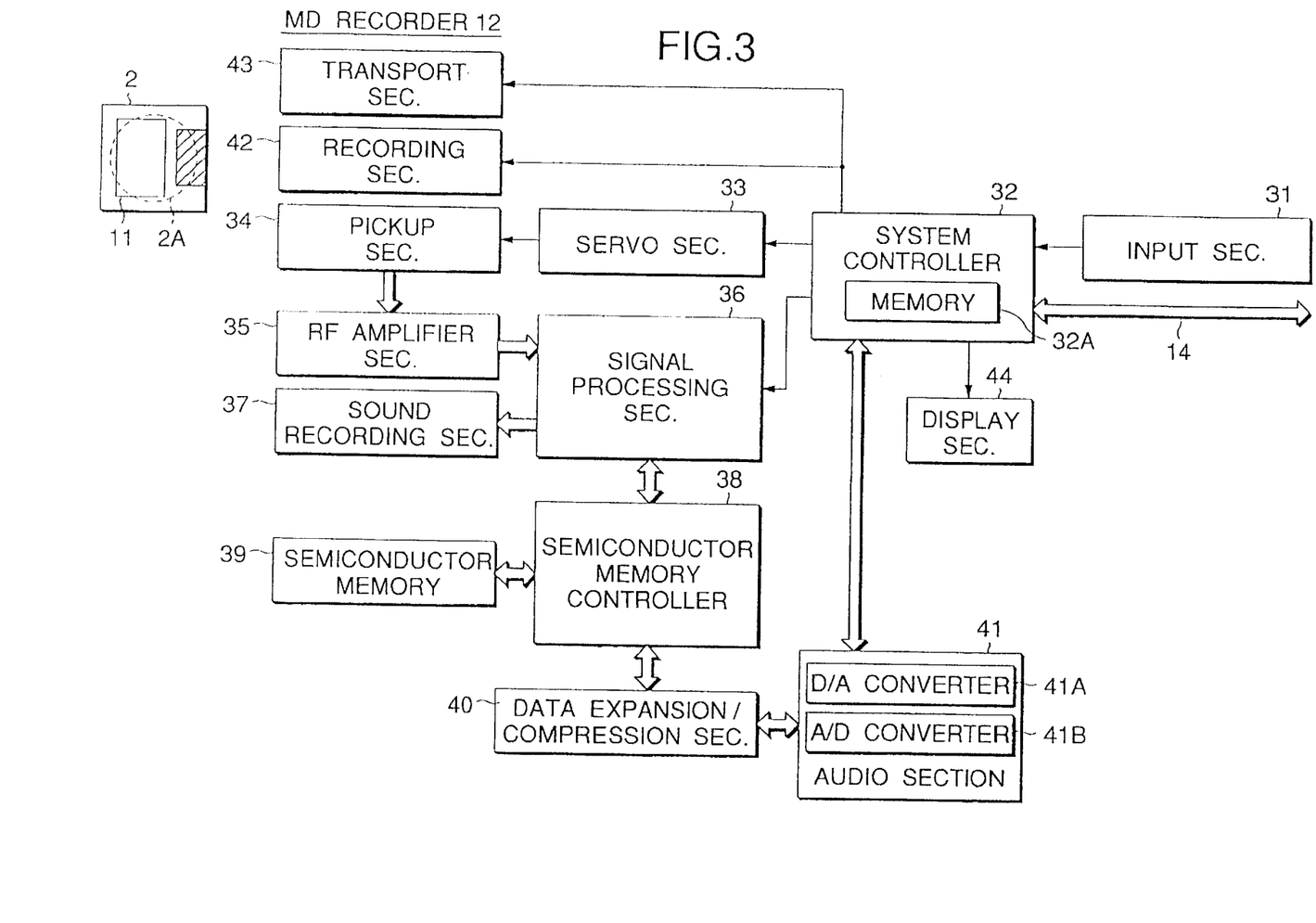
FIG. 3 is a block diagram showing an exemplary internal configuration of an MD recorder 12 shown in FIG. 4.

FIG. 3 shows an exemplary internal configuration of the MD recorder 12. An input section 31 is a keyboard, a touch panel, a mouse, a remote controller, or the like, and is manipulated by a user. A system controller 32 is a microcomputer, for instance, and controls the respective sections to perform playback or sound recording on the MD 2. The system controller 32 stores TOC information etc. that are input from the CD player 15 in a memory 32A that is incorporated in the system controller 32.

A servo section 33 controls a pickup section 34, receiving an instruction from the system controller 32. The pickup section 34 reads out a compressed musical signal from the MD 2 and outputs it to an RF amplifier section 35. The RF amplifier section 35 amplifies a musical signal that is input from the pickup section 34 and outputs the amplified musical signal to a signal processing section 36.

The signal processing section 36 demodulates a musical signal that is input from the RF amplifier section 35, performs error detection and correction on it, and supplies, for storage, a musical signal for reproduction to a semiconductor memory 39 via a semiconductor memory controller 38. Further, the signal processing section 36 performs interleaving, error detection, addition of an error code, and other processing on a musical signal for recording that is input from the semiconductor memory 39 via the semiconductor memory controller 38, and outputs a resulting musical signal to a sound recording section 37. The sound recording section 37 records a musical signal that is input from the signal processing section 36 onto the MD 2 (more correctly, the disc 2A incorporated therein). Controller by the system controller 32, the semiconductor memory controller 38 makes the semiconductor memory 39 store a musical signal for reproduction or recording.

A data expansion/compression section 40 expands a musical signal for reproduction that is input from the semiconductor memory 39 via the semiconductor memory controller 38, and supplies, for recording, the expanded musical signal to the semiconductor memory 39 via the semiconductor memory controller 38. The data expansion/compression section 40 reads out an expanded musical signal from the semiconductor memory 39 via the semiconductor memory controller 38 and outputs it to an audio section 41. Further, the data expansion/compression section 40 supplies a musical signal for recording that is input from the audio section 41 to the semiconductor memory 39 via the semiconductor memory controller 38 and records it onto the semiconductor memory 39. The data expansion/compression section 40 then reads out this musical signal for recording from the semiconductor memory 39 via the semiconductor memory controller 38, compressing it, and again writes the compressed musical signal to the semiconductor memory 39.

The audio section 41 D/A-converts, with an incorporated D/A converter 41A, a musical signal for reproduction that is input from the data expansion/compression section 40. Further, the audio section 41 A/D converts, with an incorporated A/D converter 41B, a musical signal for recording that is input from the system controller 32, and outputs the resulting musical signal to the data expansion/compression section 40.

A recording section 42, which is, for instance, a thermal head, records (i.e., prints), by generating heat, character information that i s input from the system controller 32 onto the sheet 11 so that it is visually recognizable. A transport section 43 transports the MD 2 to a sound recording position of the sound recording section 37 or a recording position of the recording section 42. A display section 44 displays music information etc. that are output from the system controller 32.

Figure 6:
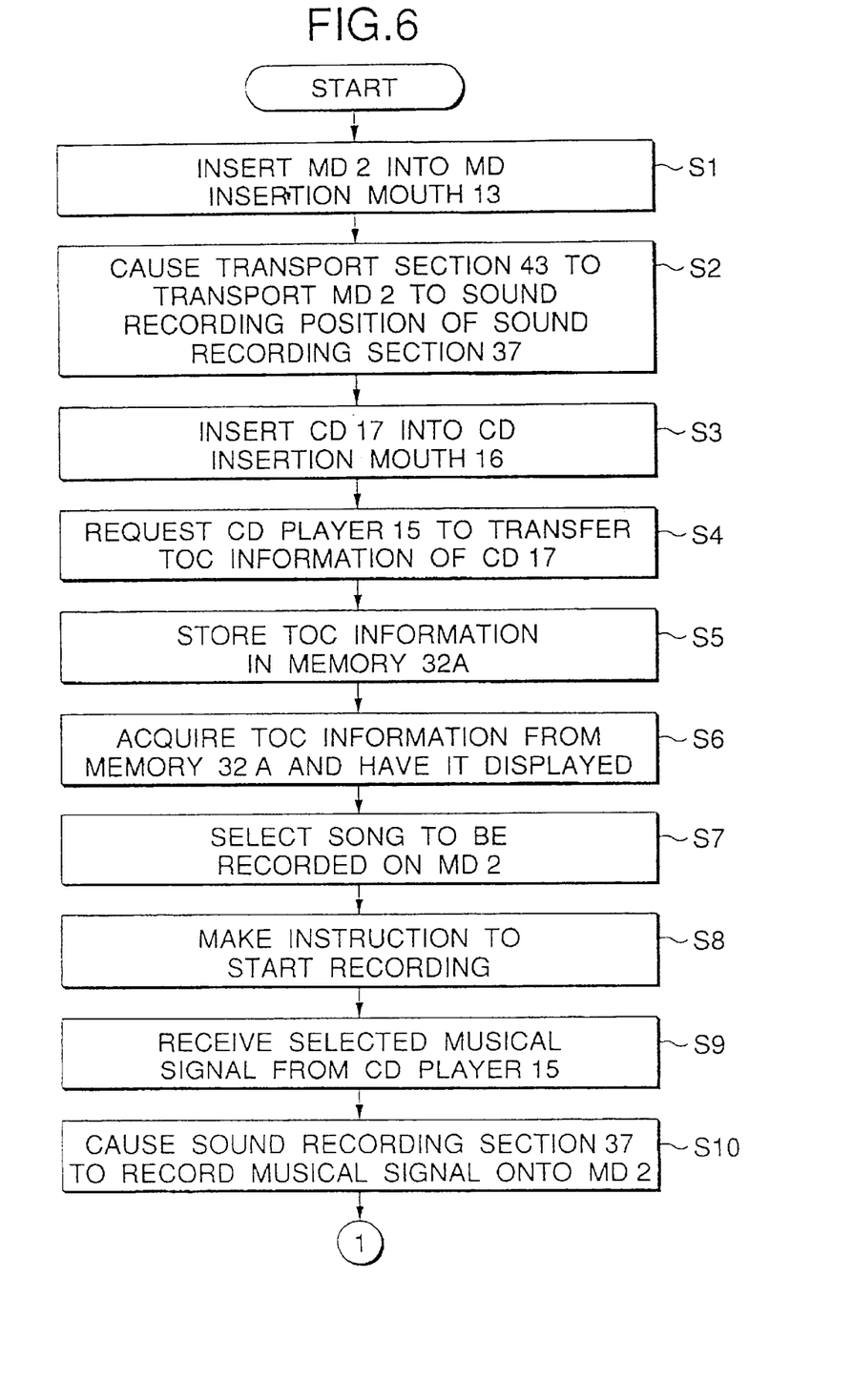
FIGS. 6–8 are a flowchart showing the operation of the first embodiment.
Figure 7:
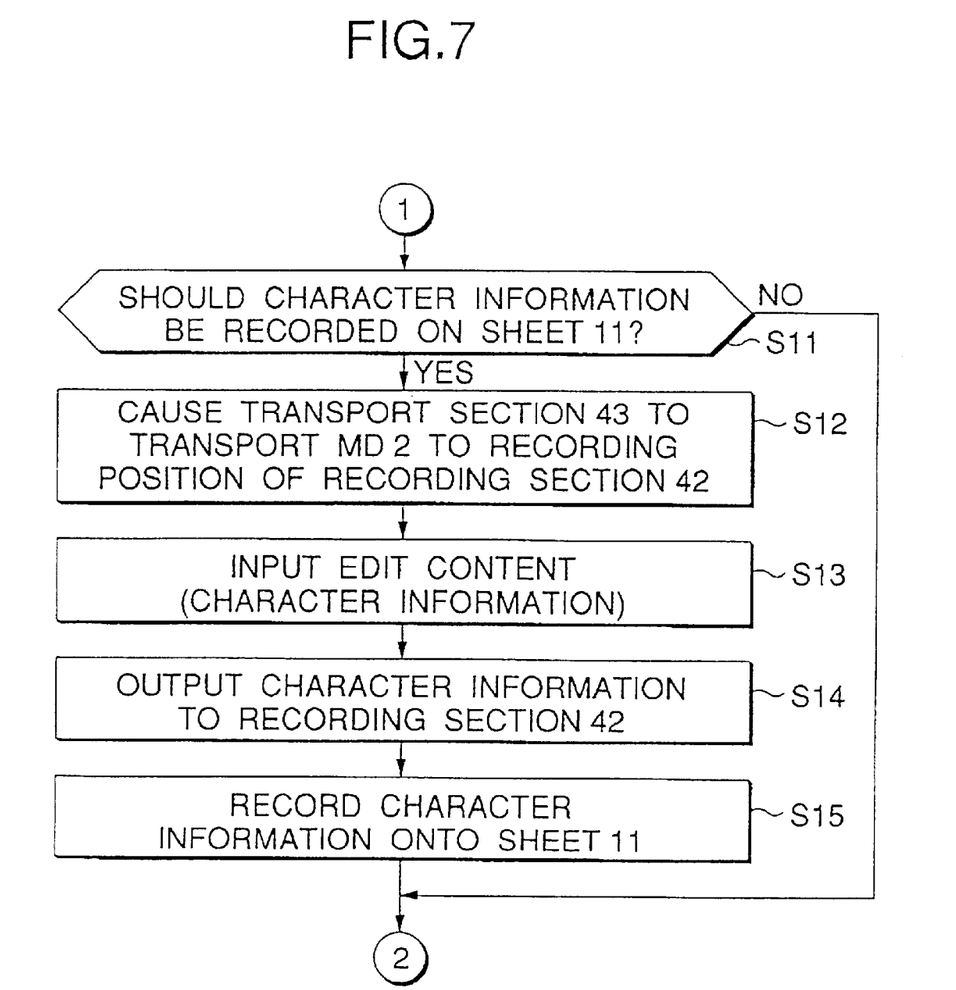
Figure 8:
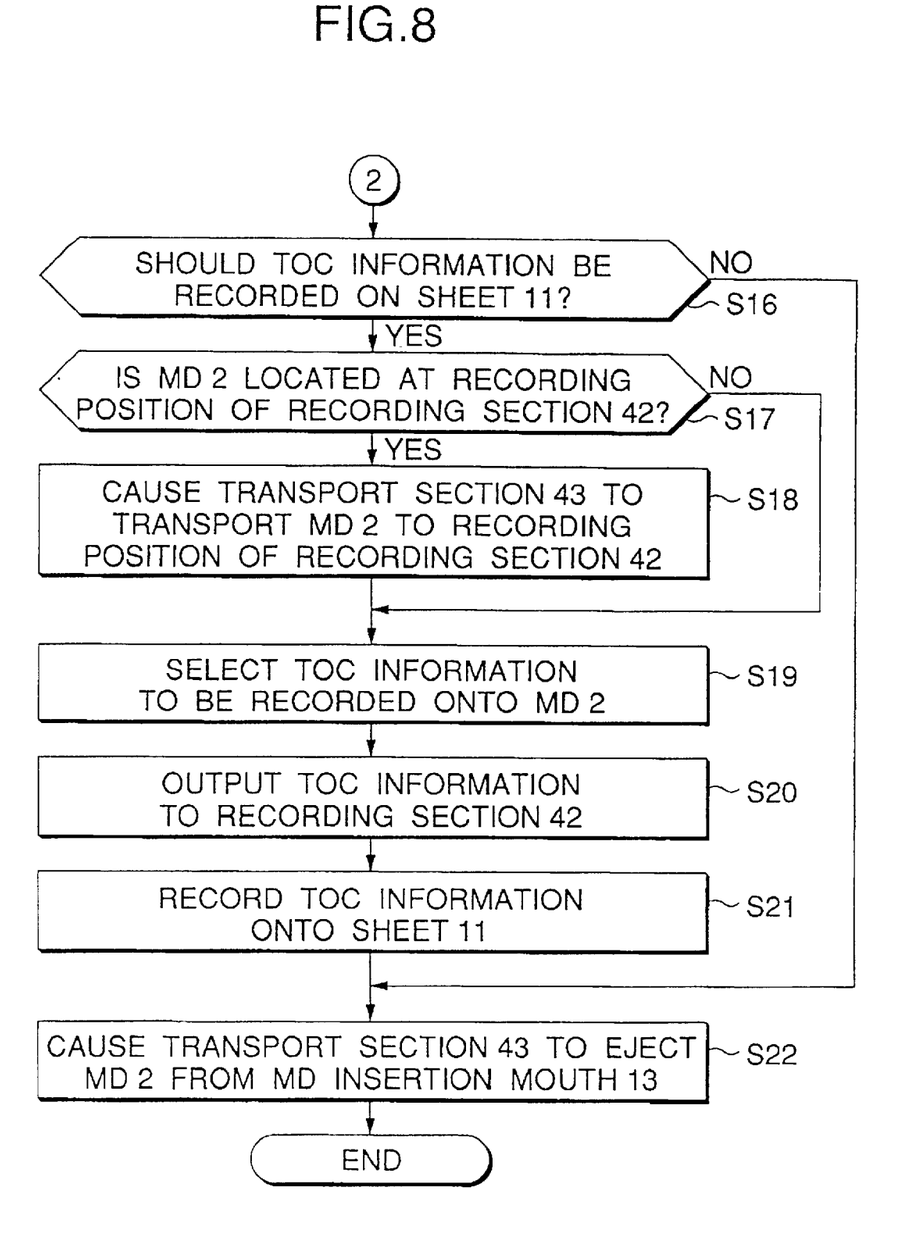

Next, the operation of the above-configured first embodiment will be described below with reference to flowcharts of FIGS. 6–8.

Figure 9A:
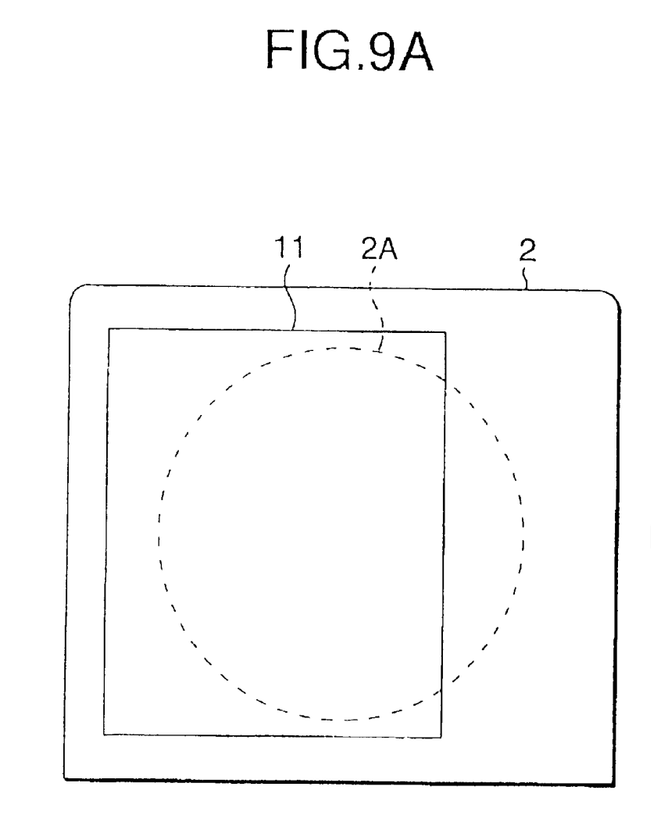
FIGS. 9A and 9B show how the state of an MD 2 is changed according to the first embodiment.

First, at step S1, when the user records a musical signal onto the MD 2, he inserts the MD 2 on which no data is recorded into the MD insertion mouth 13 of the MD recorder 12. As shown in FIG. 9A, no information is displayed on the sheet 11 of the MD 2 on which no data is recorded.

At step S2, the system controller 32 controls the transport section 43 to have it transport the MD 2 to the sound recording position of the sound recording section 37. At step S3, the user inserts the CD 17 into the CD insertion mouth 16 of the CD player 15.

At step S4, the system controller 32 outputs, to the CD player 15, a signal for requesting transfer of the TOC information of the CD 17. This request signal is supplied to the CD player 15 via the bus 14. Upon reception of this signal, the CD player 15 reads out the TOC information of the CD 17 and transfers it to the system controller 32.

At step S5, the system controller 32 stores the TOC information in the memory 32A. At step S6, the system controller 32 outputs the TOC information that is stored in the memory 32A to the display section 44 and makes the display section 44 display the TOC information.

Next, at step S7, the user selects a music to be recorded onto the MD 2 from the TOC information (from among songs recorded on the CD 17) displayed on the display section 44 by manipulating the input section 31.

After the selection of the song to be recorded onto the MD 2, at step S8 the user makes an instruction to start recording by manipulating the input section 31. At step S9, the system controller 32 outputs, to the CD player 15, a signal (for instance, an identification number given to the selected song) for requesting transfer of a musical signal. Upon reception of the identification signal via the bus 14, the CD player 15 reproduces the corresponding song from the CD 17 and transfers it to the system controller 32 via the bus 14.

At step S10, the system controller 32 outputs, to the audio section 41, the musical signal that is input from the CD player 15. The audio section 41 A/D-converts, with the incorporated A/D converter 41B, the musical signal that is input from the system controller 32, and outputs the resulting musical signal to the data expansion/compression section 40. The data expansion/compression section 40 records the musical signal that is input from the audio section 41 in the semiconductor memory 39 via the semiconductor memory controller 38. The data expansion/compression section 40 then reads out this musical signal from the semiconductor memory 39 via the semiconductor memory controller 38, compresses it, and again writes the compressed musical signal to the semiconductor memory 39.

The semiconductor memory controller 38 reads out the musical signal that was compressed by the data expansion/compression section 40 from the semiconductor memory 38, and outputs it to the signal processing section 36. The signal processing section 36 performs interleaving, error detection, addition of a correction code, and other processing on the musical signal that is input from the semiconductor memory controller 38, and outputs a resulting musical signal to the sound recording section 37. The sound recording section 37 records the musical signal that is input from the signal processing section 36 onto the MD 2.

After the sound recording operation has been completed in the above manner, at step S11 (see FIG. 7) the user judges whether to record a recorded content (character information) onto the sheet 11 and makes an input by manipulating the input section 31. The process goes to step S12 if character information is to be recorded. If character information need not be recorded, the process goes to step S16 skipping steps S12–S15.

At step S12, the system controller 32 controls the transport section 43 to have it transport the MD 2 to the recording position of the recording section 42 (different from the sound recording position of the sound recording section 37).

At step S13, the user inputs character information (for instance, a song name and a title) corresponding to the recorded song by manipulating the input section 31. The input can be done by specifying proper ones from song names and titles that are displayed on the display section 44 with a pointer such as a cursor. Naturally the MD recorder 12 may be constructed so as to allow direct input of characters through a keyboard or the like. At step S14, the system controller 32 outputs the input character information to the recording section 42.

At step S15, the recording section 42 records the character information that is input from the system controller 32 onto the sheet 11.

The operation of recording character information onto the MD 2 will now be described with reference to FIGS. 10A–10D.

Figure 10A:
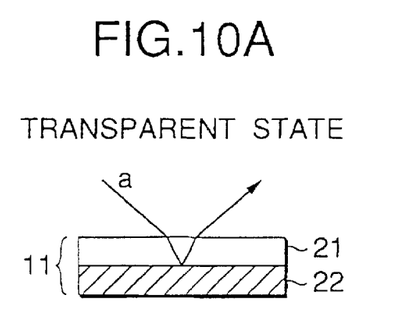
FIGS. 10A–10D illustrate how character information is recorded at step S15 of FIG. 7.
Figure 10B:
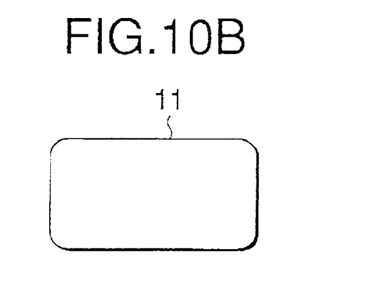

In a state that no character information is recorded, in this example the thermal member 21 is in a transparent state. When the thermal member 21 is in the transparent state, as shown in FIG. 10A, incident light a passes through the thermal member 21 and is reflected by the surface of the back sheet 22. Therefore, as shown in FIG. 10B, the sheet 11 looks as if to have the color (black) of the back sheet 22. In this case, no character information is displayed on the sheet 11 as shown in FIG. 9A.

Figure 9B:
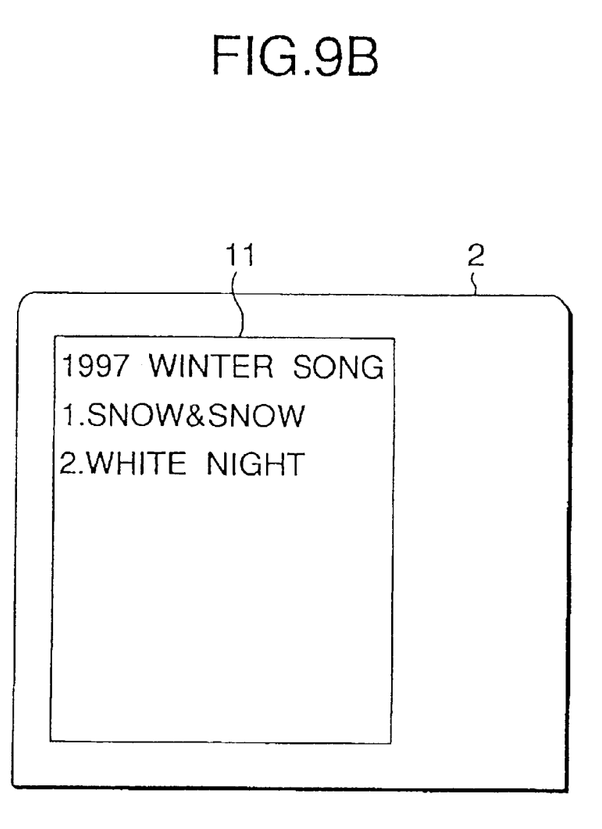
Figure 10C:
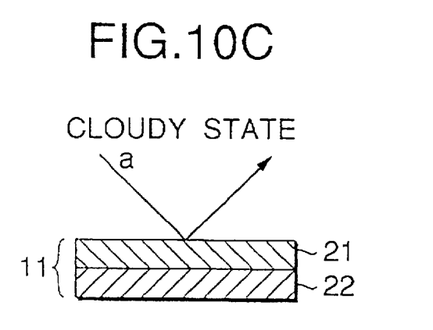
Figure 10D:
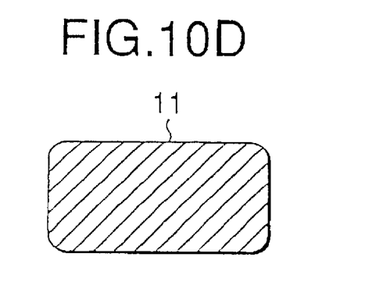

On the other hand, when character information has been recorded, those portions of the thermal member 21 which correspond to the character information are rendered cloudy and incident light a is reflected by the surfaces of those portions as shown in FIG. 10C. Therefore, those portions of the sheet which correspond to the character information looks white (looks as if to have a different color than the back sheet 22) as shown in FIG. 10D. As a result, as shown in FIG. 9B, the character information is displayed because of a contrast in color between the cloudy portions and the back sheet 22.

Next, at step S16 (see FIG. 8), the user judges whether to record other TOC information such as the reproduction time of each song onto the sheet 11 and makes an input by manipulating the input section 31. The process goes to step S17 if other TOC information is to be recorded. If other TOC information need not be recorded, the process goes to step S22 skipping steps S17–S21.

At step S17, the system controller 32 judges whether the MD 2 is located at the recording position of the recording section 42. If the MD 2 is not located there, at step S18 the system controller 32 controls the transport section 43 to have it transport the MD 2 to the recording position of the recording section 42. If the MD 2 is located at the recording position of the recording section 42, step S18 is skipped.

At step S19, the system controller 32 outputs the TOC information that is stored in the incorporated memory 32A to the display section 44 and makes it display the TOC information. Then, the user selects TOC information (for instance, playing time) to be recorded onto the MD 2 from the TOC information being displayed on the display section 44 by manipulating the input section 31.

At step S20, the system controller 32 outputs the selected TOC information to the recording section 42. At step S21, the recording section 42 records the TOC information onto the sheet 11 (that is, it makes cloudy those portions of the photosensitive member 21 which correspond to the TOC information). Where the MD player 12 causes the user to also select a song name, a title, etc. from the TOC information, the related processing may be performed at steps S16–S21, in which case steps S11–S15 can be omitted.

At step S22, the system controller 32 controls the transport section 43 to have it eject the MD 2 from the MD insertion mouth 13. In this manner, the MD 2 in which the character information is displayed on the sheet 11 is obtained as shown in FIG. 9B.

To alter the musical information of the MD 2, the user performs operations similar to the above-described operations. Since the sheet 11 is rewritable, the character information is rewritten to one corresponding to newly recorded songs.

Figure 11:
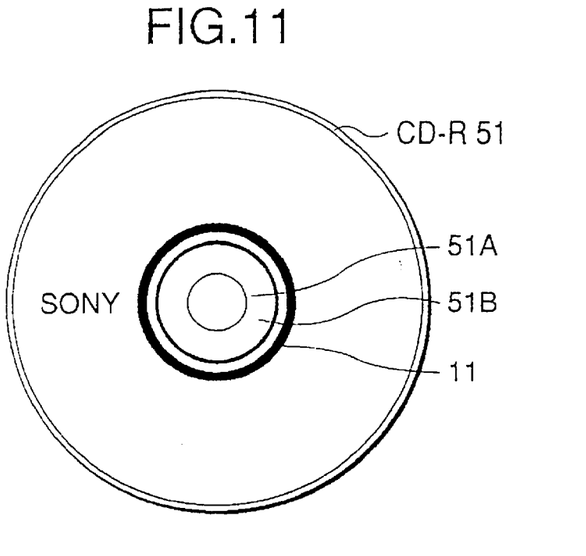
FIG. 11 shows an exemplary structure of a CD-R 51 according to a second embodiment of the invention.

While in the first embodiment character information is recorded on the MD 2 (i.e., the sheet 11 on the cartridge 2B), character information can also be recorded on a recording medium that is not accommodated in a cartridge as in the case of the CD-R (compact disc-recordable; trademark), for instance. FIG. 11 shows an embodiment of the latter case. Since in this second embodiment the basic configuration and operation of the recording/playback apparatus are the same as in the above described case, only the structure of a recording medium will be described below.

As shown in FIG. 11, a CD-R 51 is formed with a center hole 51A in its center portion as well as a transparent portion 51B in its inside portion (outside the center hole 51A). An annular sheet 11 is bonded in advance to that portion of the surface which is outside the transparent portion and on which no data is to be recorded.

In the second embodiment, the sheet 11 is formed in annular form. Therefore, when data writing to the CD-R 51 has been finished, character information can be recorded onto the sheet while the CD-R 51 is rotated at the same position. Hence, in this case, the sound recording position of the sound recording section 37 is the same as the recording position of the recording section 42.

Figure 12:
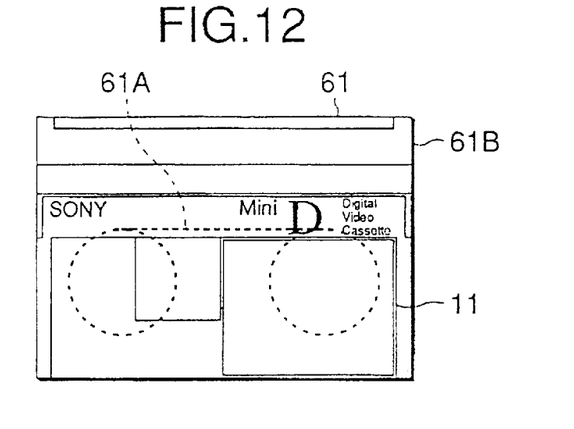
FIG. 12 shows an exemplary structure of a digital video cassette 61 according to a third embodiment of the invention.

While in the above embodiments character information is recorded on an optical disc, it may also be recorded on a digital video cassette, for instance. FIG. 12 shows an embodiment of the latter case. Also in this third embodiment, the basic configuration and operation of the recording/playback apparatus are the same as in the above described cases, and hence only the structure of a recording medium will be described below.

As shown in FIG. 12, in a digital video cassette 61 which is a recording medium enabling data recording and reproduction, a magnetic tape 61A is accommodated in a cassette 61B as a body. A sheet 11 is bonded in advance to a portion of the surface of the cassette 61B. As in the above-described case of the disc cartridge 2B, if the sheet bonding surface of the cassette 61B is formed with a shallow recess corresponding to the shape of the sheet 11, the sheet 11 can be prevented from protruding from the surface of the cassette 61B by a distance corresponding to its thickness.

In the third embodiment, character information is recorded onto the sheet 11 in the same manner as in the first embodiment. Where character information is transmitted together with video information as in the case of PerfecTV (service mark), for instance, the recording/playback apparatus receives both video and character information and records the video information and the character information onto the magnetic tape 61A and the sheet 11, respectively.

Next, a fourth embodiment will be described below with reference to FIG. 13.

Figure 13:
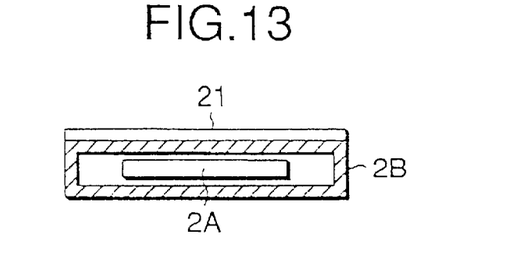
FIG. 13 is a sectional view showing an exemplary structure of an MD 2 according to a fourth embodiment of the invention.

As shown in FIG. 13, a thermal member 21 is bonded to at least one surface (entire surface) of a cartridge 2B of an MD 2 so as to be inseparable from it. The recording section 42 is configured so as to change the color of the MD 2 by generating heat.

Figure 14:
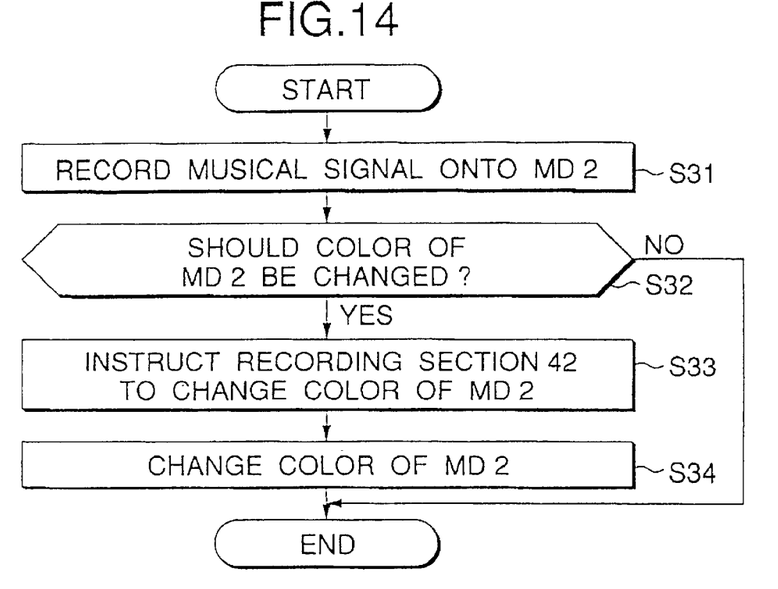
FIG. 14 is a flowchart showing a process of changing the color of the MD 2 according to the fourth embodiment.

The basic operation of the fourth embodiment will be described below with reference to a flowchart of FIG. 14.

Figure 15A:
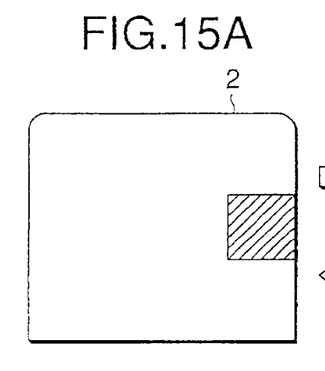
FIGS. 15A and 15B show states of the MD 2 in the fourth embodiment.

First, at step S31, a user records a musical signal onto the MD 2 on which no data is recorded. This step is the same as in the first embodiment. The MD 2 on which no data is recorded has a predetermined color (cloudy state) as shown in FIG. 15A.

At step S32, the user judges whether to change the color of the MD 2 and makes an input. If the color of the MD 2 is to be changed, at step S33 the system controller 32 outputs, to the recording section 42, a signal for instructing it to change the color of the MD 2. At step S34, the recording section 42 changes the color of the MD 2. On the other hand, if the color of the MD 2 need not be changed, the process is finished with steps S33 and S34 skipped.

Figure 16A:
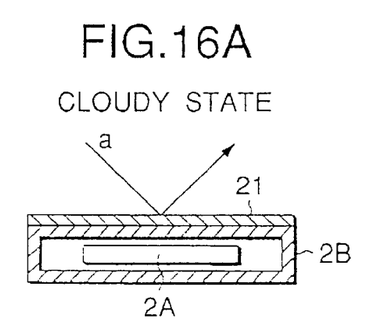
FIGS. 16A and 16B illustrate a process of changing the color of the MD 2 at step S34 of FIG. 14.
Figure 16B:
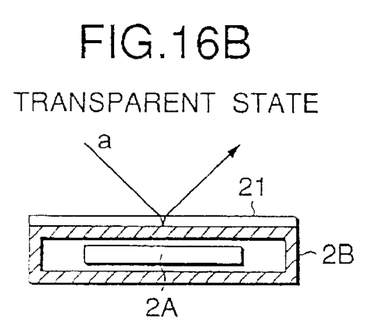

The operation of changing the color of the MD 2 will now be described with reference to FIGS. 16A and 16B.

Figure 15B:
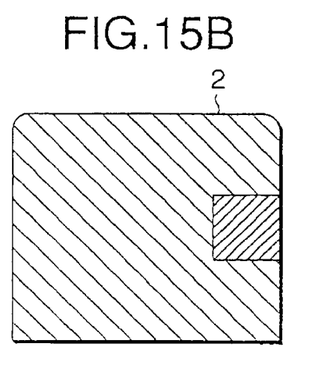

When no data is recorded on the MD 2, the thermal member 21 is in a cloudy state. In this case, incident light a is reflected by the surface of the thermal member 21 as shown in FIG. 16A, and hence the MD 2 (cartridge 2B) looks white as shown in FIG. 15A. On the other hand, when data is recorded on the MD 2, the thermal member 21 is rendered transparent. In this case, incident light a passes through the thermal member 21 and is reflected by the surface of the cartridge 2B as shown in FIG. 16B, and hence the MD 2 looks as if to have the color of the cartridge 2B as shown in FIG. 15B.

In this manner, the color of the cartridge 2B allows a judgment as to whether data is recorded on the MD 2. The user may use cartridges 2B of different colors depending on the genre (western music, opera music, enka ballad, etc.) in accordance with the data to be recorded on the MD 2.

Figure 17:
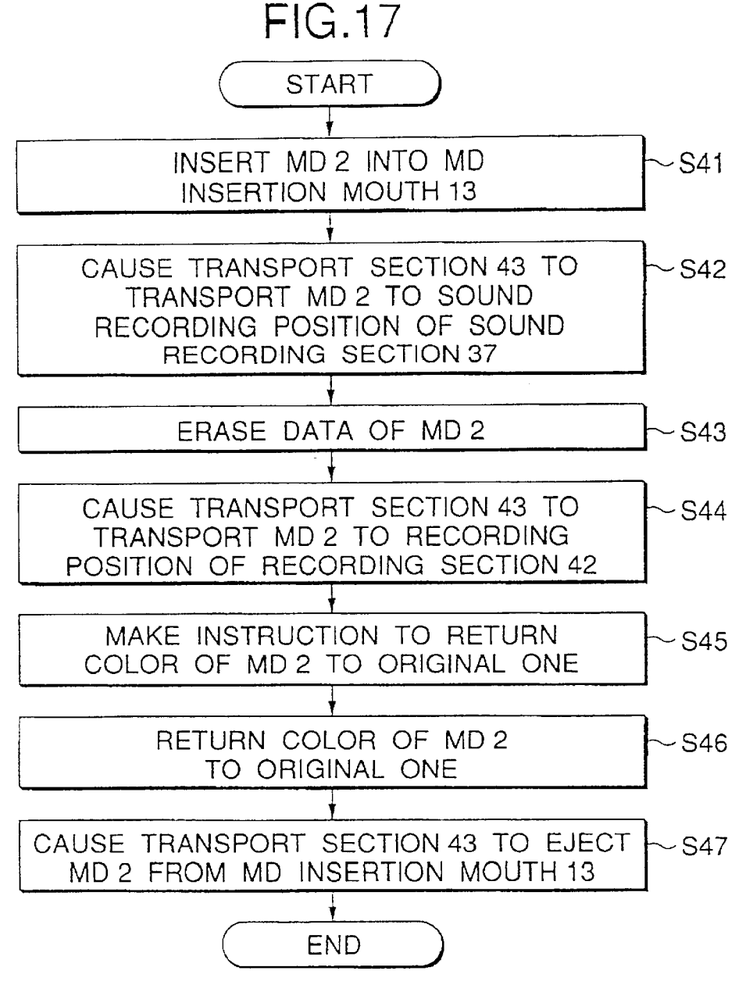
FIG. 17 is a flowchart showing a process of erasing the data of the MD 2 according to the fourth embodiment.

A process of erasing the data of the MD 2 will now be described with reference to a flowchart of FIG. 17.

First at step S41, when the user intends to erase the recording contents of the MD 2, he inserts the MD 2 on which data is recorded into the MD insertion mouth 13. The color of the MD 2 on which data is recorded is changed to that of the cartridge 2B as shown in FIG. 15B.

At step S42, the system controller 32 controls the transport section 43 to have it transport the MD 2 to the sound recording position of the sound recording section 37.

At step S43, the system controller 32 outputs, to the signal processing section 36, a signal for instructing it to erase the data of the MD 2. The signal processing section 36 outputs a corresponding signal to the sound recording section 37. The sound recording section 37 erases the data by recording the received signal onto the MD 2.

At step S44, the system controller 32 controls the transport section 43 to have it transport the MD 2 to the recording position of the recording section 42.

At step S45, the system controller 32 outputs, to the recording section 42, a signal for instructing it to return the color of the MD 2 to the original one. At step S46, the recording section 42 returns the color of the MD 2 to the original one (i.e., renders the thermal member 21 cloudy).

At step S47, the system controller 32 controls the transport section 43 to have it eject the MD 2 from the MD insertion mouth 13. In this manner, the MD 2 that is rendered white (the original color is restored) is obtained as shown in FIG. 16A.

For example, the thermal member 21 used in the above embodiments may be one used in "Thermal Rewrite Card" (trademark) that was jointly developed by Dai Nippon Printing Co., Ltd. and Star Micronics Co., Ltd.

For example, the thermal member 21 is of a type in which a thermal recording layer obtained by dispersing an organic low-molecular-weight substance in a synthetic resin is formed on a base sheet. When the thermal recording layer is heated to a predetermined temperature by a thermal head or the like, the crystal structure of the dispersed organic low-molecular-weight substance is changed whereby the thermal recording layer is rendered transparent or opaque.

Various kinds of fatty acids and their derivatives can be used as the organic low-molecular-weight substance used in the thermal recording layer. Among those, saturated straight-chain fatty acids having a carbon number 10–30 and a melting point 30–160° C. are preferable. Specific examples are monocarboxylic acids such as capric acid, lauric acid, dodecanoic acid, myristic acid, pentadecanoic acid, palmitic acid, heptadecanoic acid, stearic acid, nonadecanoic acid, arachic acid, heneicosanoic acid, behenic acid, tricosanoic acid, lignoceric acid, and pentacosanoic acid; and dicarboxylic acids such as pimelic acid, suberic acid, azelaic acid, sebacic acid, undecanoic di acid, dodecanoic di acid, tridecanoic di acid, tetradecanoic di acid, pentadecanoic di acid, hexadecanoic di acid, heptadecanoic di acid, octadecanoic di acid, nonadecanoic di acid, eicosanoic di acid, heneicosanoic di acid, and docosanoic di acid.

Examples of the synthetic resin in which the organic low-molecular-weight substance is to be dispersed are vinyl chloride type resins such as polyvinyl chloride, a vinyl chloride-vinyl acetate copolymer, its partial saponide, a vinyl chloride-vinyl acetate-maleic acid copolymer, and a vinyl chloride-acrylic ester copolymer; vinylidene chloride type resins such as a vinylidene chloride-vinyl chloride copolymer, a vinylidene chloride-acrylic ester copolymer, and a vinylidene chloride-acrylonitrile copolymer; acrylic resins such as polyacrylic ester, polymethacrylic ester; and various kinds of polyester resins. A synthetic resin that are superior in transparency and film forming performance and in which the organic low-molecular-weight substance can be dispersed uniformly may be selected from among the above ones.

To improve the film forming performance and the workability, the thermal recording layer may include a high boiler, a surfactant, etc. in addition to the organic low-molecular-weight substance and the synthetic resin.

Figure 18:
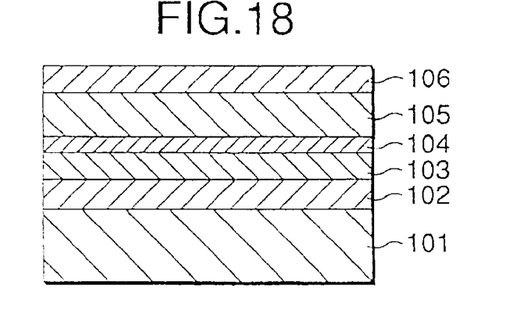
FIG. 18 is a schematic sectional view of the main part showing an exemplary structure of a thermal member.

The thermal member 21 may have an arbitrary structure. For example, as shown in FIG. 18, it may be formed by sequentially laminating a smoothing layer 102, a light reflection layer 103, a primer layer 104, a thermal recording layer 105, and a protective layer 106 on a base sheet 101.

The base sheet 101 may be made of an arbitrary material such as plastic film or metal foil. For example, if the base member 101 is made of aluminum foil, the smoothing layer 102 and the light reflection layer 103 can be omitted.

The smoothing layer 102 plays a role of smoothing the asperity of the base sheet 101 to thereby increase the reflectance of the light reflection layer 103, and is formed by applying a material selected from various kinds of resin materials.

The light reflection layer 103, which is formed, for instance, by evaporating a metal material, provides metallic luster when the thermal member 21 is observed. Where the light reflection layer 103 is formed or the base sheet 101 is made of metal foil, it is not necessary to provide the black back sheet 22 on the back side of the thermal member 21. Conversely, where the back sheet 22 is provided, a transparent plastic film is used as the base sheet 101 and the light reflection layer 103 is omitted.

The primer layer 104, which is to improve the adhesiveness of the thermal recording layer 105, is formed by applying polyester resin, a vinyl chloride-vinyl acetate copolymer, or the like.

The protective layer 106, which is to protect the thermal recording layer 105 from physical or chemical damage, is made of a ultraviolet curable resin, for instance. Since the protective layer 106 also serves as a cushion, it is preferable that it be made of a resin having an extension coefficient of 5–100%.

Related information is recorded, i.e., printed, on the thermal member 21 by a thermal head that is provided in the recording section 42. The thermal head is configured in such a manner that minute resistive bodies are arranged in line. The resistive bodies are selectively heated by energizing those selectively, whereby characters are written to the thermal member 21.

Instead of the thermal member 21, the related information recording section may be made of, for instance, a magnetic display sheet used in "Eye-Messe Card" (trademark) that was jointly developed by Dai Nippon Printing Co., Ltd. and Star Micronics Co., Ltd. Eye-Messe Card allows recording and erasure of characters by changing the orientation of a magnetic powder by generating magnetism.

In the above magnetic display sheet, the orientation of a magnetic powder in microcapsules changes when magnetic force is applied to it, whereby the color contrast is changed greatly. Character information or the like can be displayed in this manner.

Figure 19A:
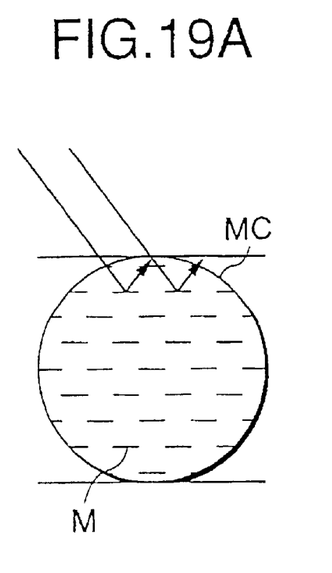
FIGS. 19A and 19B are schematic drawings illustrating the principle of display of a magnetic display sheet.
Figure 19B:
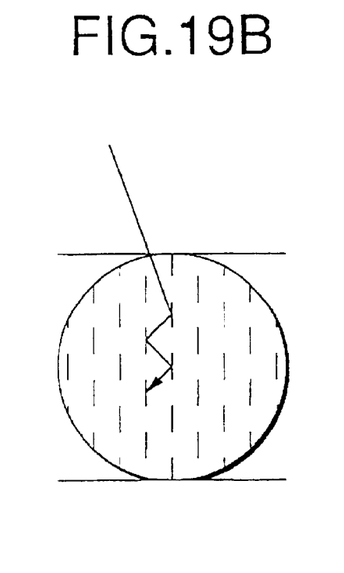

For example, where a magnetic powder M is oriented so as to reflect incident light as shown in FIG. 19A, a user sees the color (yellow or gray) of oil in microcapsules MC. Where the magnetic powder M is oriented so that incident light is absorbed as shown in FIG. 19B, the sheet looks black. By virtue of such a difference in color contrast, related information is displayed so as to be visually recognizable.

Arbitrary magnetic powders such as iron oxide type and alloy type magnetic powders can be used as the magnetic powder to be sealed in the microcapsules. Specific examples of usable materials are iron, nickel, iron-nickel, iron-nickel-chromium, aluminum-cobalt alloy, and samarium-cobalt alloy. It is preferable that each magnetic particle be shaped like a scale or a flake. The particle size is set at about 3–15 $\mu$m.

An example of the oil that is sealed together with the magnetic powder is a mixture of a polar liquid, a hydrophobic liquid, and a thermoplastic resin. Examples of the polar liquid are esters, dibutyl phthalate, octyl phosphate diphenyl, dioctyl sebacate, triacetone, and castor oil. Examples of the hydrophobic liquid are liquids that used in microcapsules for pressure-sensitive copying paper, such as low-volatility aliphatic and aromatic hydrocarbons, and their mixtures.

Figure 20:
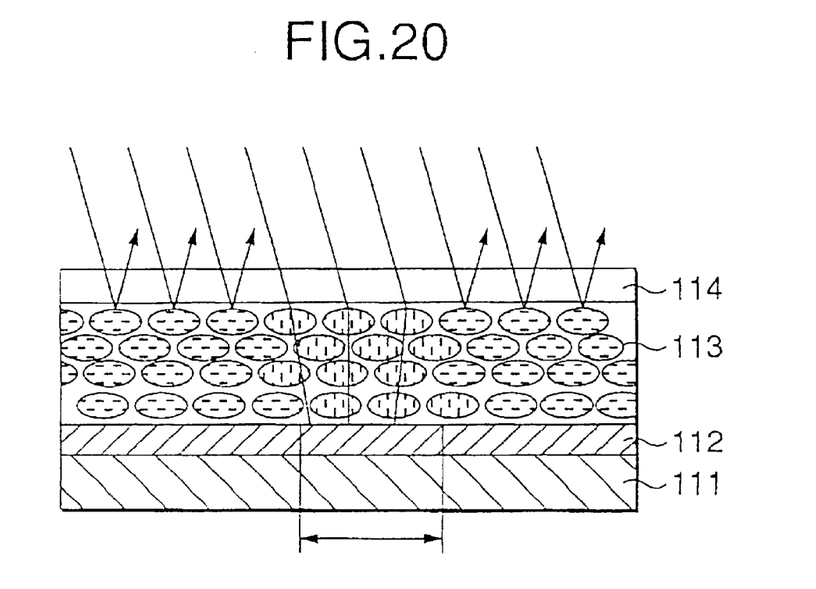
FIG. 20 is a schematic sectional view showing an exemplary structure of the magnetic display sheet.

As shown in FIG. 20, the magnetic display sheet is configured in such a manner that a display layer 113 including the above-mentioned microcapsules is formed on a base member 111 that is colored by a back coat layer 112 and a protective layer 114 is formed so as to cover the display layer 113.

With the above magnetic display sheet, the related information is recorded (printed) by orienting the magnetic powder in the microcapsules by using a magnetic head. For example, when a vertical magnetic field is applied to the display layer 113, the magnetic powder in the microcapsules is oriented in the vertical direction, whereby the color (for instance, black) of the back coat layer 112 is recognized as characters. On the other hand, if a horizontal magnetic field is applied to the display layer 113, the magnetic powder is oriented in the horizontal direction, whereby the color of the back coat layer 112 disappears and characters are erased. By repeatedly changing the magnetic field direction, display and erasure can be performed any desired times. Therefore, where the above magnetic display sheet is used, a magnetic head is incorporated in the recording section 42.

The related information recording section is not limited to the one having the above configuration; it may be of any type as long as it is capable of printing character information or the like in a visually recognizable manner.

Although in the first embodiment the sheet 11 is bonded to only one surface (front surface) of the MD 2 and character information is recorded thereon as shown in FIG. 9B, the sheet 11 may be bonded to the back surface of the MD 2 and character information may be recorded thereon as shown in FIG. 18.

Although in the first embodiment the independently constructed MD recorder 12 and CD player 15 are connected to each other via the bus 14, a recording/reproduction apparatus may be constructed in which the MD recorder 12 and the CD player 15 are made integral with each other.

Although in the first and fourth embodiments the MD 2 is used as a recording medium, other recording media each accommodated in a cartridge, such as an MO (magneto-optical) disc, may be used.

Further, the invention can also be applied to recording media in which a disc cartridge or a tape cassette is incorporated in an outer case. In this case, the recording medium recording apparatus may be provided with a mechanism for inserting and removing the recording medium into and from the outer case and related information may be recorded (printed) on the outer case.

Although in the second embodiment the CD-R 51 is used as a recording medium, other disc-shaped recording media such as a DVD (digital video disc; trademark) may be used.

As described above, according to the recording medium recording apparatus and method of the invention, since related information is recorded on a recording medium, it can be recognized at the same time as data is recorded.

Further, according to the recording medium of the invention, since it is provided with a data recording section where data is to be recorded and a related information section where related information is to be recorded, related information can be recorded as well as data.

What is claimed is:

1. A recording medium recording apparatus comprising:
    data input means for inputting data to be recorded on a recording medium;
    data recording means for recording the data onto a data recording section in the recording medium;
    related information input means for inputting visually recognizable information relating to the data; and
    related information recording means for recording the visually recognizable related information onto a related information section of the recording medium so that the related information is visually recognizable.

2. The recording medium recording apparatus according to claim 1, wherein the related information recording means records the related information when the data is recorded onto the recording medium.

3. The recording medium recording apparatus according to claim 1, wherein the related information recording section includes a thermal member, and the related information recording means comprises a thermal head.

4. The recording medium recording apparatus according to claim 1, wherein the related information recording section includes a magnetic member, and the related information recording means comprises a magnetic head.

5. A recording medium recording method used in recording data onto a recording medium that is mounted in a recording apparatus, comprising the steps of:
    inputting data to be recorded on the recording medium;
    recording the data onto a data recording section of the recording medium;
    inputting visually recognizable information relating to the data; and
    recording the visually recognizable related information onto a related information section of the recording medium so that the related information is visually recognizable.

6. A recording medium onto which data is to be recorded when it is mounted in a recording apparatus, comprising:
    a data recording section onto which the data is to e recorded in a state that the recording medium is mounted in the recording apparatus; and
    a visually recognizable related information recording section onto which visually recognizable related information that relates to the data is to be recorded in a state that the recording medium is mounted in the recording apparatus.

7. The recording medium according to claim 6, wherein the related information recording section is rewritable.

8. The recording medium according to claim 6, wherein the related information recording section includes a thermal member.

9. A recording medium onto which data is to be recorded when it is mounted in a recording apparatus, comprising:
    a data recording section onto which the data is to e recorded in a state that the recording medium is mounted in the recording apparatus; and
    a visually recognizable related information recording section onto which visually recognizable related information that relates to the data is to be recorded in a state that the recording medium is mounted in the recording apparatus,
    wherein,
    organic low-molecular-weight substance is dispersed in a synthetic resin, and
    the related information recording section includes a thermal member.

10. The recording medium according to claim 8, wherein the related information recording section includes a bonded sheet-shaped thermal member.

11. The recording medium according to claim 6, wherein the related information recording section includes a magnetic member.

12. A recording medium onto which data is to be recorded when it is mounted in a recording apparatus, comprising:
    a data recording section onto which the data is to e recorded in a state that the recording medium is mounted in the recording apparatus; and
    a visually recognizable related information recording section onto which visually recognizable related information that relates to the data is to be recorded in a state that the recording medium is mounted in the recording apparatus,
    wherein,
    the magnetic member contains microcapsules in which a liquid and a magnetic powder are sealed, and
    the related information recording section includes a magnetic member.

13. The recording medium according to claim 6, wherein the data recording section is accommodated in a body, and the related information recording section is formed on the body.

14. The recording medium according to claim 13, wherein the data recording section is a magnetic disk or an optical disc and the body is a cartridge.

15. The recording medium according to claim 13, wherein the data recording section is a magnetic tape and the body is a cassette.

16. The recording medium according to claim 6, wherein the data recording section is a recording region of a magnetic disk or an optical disc, and the related information recording information recording section is formed in a region of the magnetic disk or the optical disc other than the recording region thereof.

17. The recording medium according to claim 6, wherein the data recording section is accommodated in a body that is accommodated in an outer case, and the related information recording section is formed on the outer case.

* * * * *